(12) United States Patent
Hsu et al.

(10) Patent No.: US 12,357,888 B2
(45) Date of Patent: Jul. 15, 2025

(54) CARBON-FIBER COMPOSITE GOLF CLUB HEAD

(71) Applicant: O-TA PRECISION INDUSTRY CO., LTD., Pingtung County (TW)

(72) Inventors: Yen-Chi Hsu, Pingtung County (TW); Chi-Wen Ling, Pingtung County (TW)

(73) Assignee: O-TA PRECISION INDUSTRY CO., LTD., Neipu Township, Pingtung County (TW)

( * ) Notice: Subject to any disclaimer, the term of this patent is extended or adjusted under 35 U.S.C. 154(b) by 77 days.

(21) Appl. No.: 18/066,564

(22) Filed: Dec. 15, 2022

(65) Prior Publication Data

US 2023/0191211 A1    Jun. 22, 2023

(30) Foreign Application Priority Data

Dec. 17, 2021    (TW) ................. 110147400

(51) Int. Cl.
*A63B 53/04* (2015.01)
*A63B 53/08* (2015.01)
(Continued)

(52) U.S. Cl.
CPC .......... *A63B 53/08* (2013.01); *A63B 53/0408* (2020.08); *B32B 5/02* (2013.01); *B32B 5/26* (2013.01); *B32B 7/022* (2019.01); *A63B 53/0466* (2013.01); *A63B 2053/0491* (2013.01); *A63B 2209/02* (2013.01);
(Continued)

(58) Field of Classification Search
CPC . A63B 53/042; A63B 53/045; A63B 53/0462; A63B 53/0466; A63B 2053/0491
See application file for complete search history.

(56) References Cited

U.S. PATENT DOCUMENTS 6,306,474 B1 * 10/2001 Yoshioka ................ B29C 70/88
                                                                    428/299.7
6,645,086 B1    11/2003 Chen
(Continued)

FOREIGN PATENT DOCUMENTS

CN         2922960 Y     7/2007
CN       101754786 A     6/2010
(Continued)

*Primary Examiner* — Raeann Gorden
(74) *Attorney, Agent, or Firm* — MUNCY, GEISSLER, OLDS & LOWE, P.C.

(57) ABSTRACT

A carbon-fiber composite golf club head comprises a carbon-fiber composite body, at least one carbon-fiber composite component and at least one weight component. The carbon-fiber composite body comprises a hollow body portion, one-piece formed by stacking carbon fiber prepreg materials, and a striking face portion disposed at a front end of the body portion. The at least one carbon-fiber composite component is mounted to at least one opening of one or both of a crown and a sole of the body portion. The at least one weight component is mounted at a rear end of the carbon-fiber composite body. By combining the carbon-fiber composite body, one-piece formed by carbon fiber composite material and comprising the body portion and the striking face portion, with the at least one carbon-fiber composite component, a weight of a main part of a club head is significantly reduced to increase a weight of counterweight.

15 Claims, 7 Drawing Sheets

(51) Int. Cl.
  *B32B 5/02*  (2006.01)
  *B32B 5/26*  (2006.01)
  *B32B 7/022*  (2019.01)
(52) U.S. Cl.
  CPC ..... *B32B 2250/20* (2013.01); *B32B 2260/023* (2013.01); *B32B 2262/106* (2013.01); *B32B 2307/732* (2013.01)

(56)                References Cited

U.S. PATENT DOCUMENTS

2003/0207726 A1* 11/2003 Lee .................. A63B 53/04
                                                  473/345
2020/0197769 A1*  6/2020 Stokke ............... A63B 53/08
2023/0356041 A1* 11/2023 Beach .............. A63B 53/0466

FOREIGN PATENT DOCUMENTS

| CN | 103566554 A | 2/2014 |
| CN | 211273467 U | 8/2020 |
| JP | 2006247124 A | 9/2006 |
| JP | 3126137 U | 10/2006 |
| JP | 2019188165 A | 10/2019 |
| JP | 3224026 U | 11/2019 |
| JP | 2020006157 A | 1/2020 |
| TW | M577332 U | 5/2019 |
| TW | 202138032 A | 10/2021 |

\* cited by examiner

CARBON-FIBER COMPOSITE GOLF CLUB HEAD

BACKGROUND OF THE INVENTION

1. Field of the Invention

The present invention relates to a golf club head, especially to a carbon-fiber composite wood golf club head.

2. Description of Related Art

For increasing design freedoms of a center of gravity of a conventional golf club head and a moment of inertia (MOI) in striking, the conventional golf club head partially adopts a carbon-fiber composite material, or the conventional golf club head uses a casted thin crown to decrease a weight of a body of the golf club head. The decreased weight of the body can be adapted to other parts of the conventional golf club head for changing the center of gravity of the conventional golf club head and the moment of inertia in swing.

A conventional wood golf club head uses a head base being one-piece formed by a carbon-fiber composite material and having an opening at a front end of the head base. A striking face plate made of a carbon-fiber composite material or metal material is mounted and fixed at the front end of the carbon-fiber composite material head base. And at least one weight component is mounted at a sole or a rear end of the carbon-fiber composite material head base.

In a structure of the conventional wood golf club head made of a carbon-fiber composite material, a weight of the head base can be reduced by using the carbon-fiber composite material, and the reduced weight allows more weight for a counterweight. However, the reduced weight of a conventional wood golf club head is limited as the head base thereof is made of the carbon-fiber composite material with a metal striking face plate mounted at the front end of the head base, and therefore the margin of the reduced weight for the counterweight is limited. In general, a weight of the counterweight of the conventional golf club head with a metal striking face plate is approximately around 20 g, thus limiting counterweight design freedoms. For a conventional wood golf club head using the head base made of a carbon-fiber composite material with a carbon-fiber composite striking face plate glued at the front end of the head base, compared to the above-mentioned conventional wood golf club head with the metal striking face plate, the reduced weight is increased. But a structure of the head base made of the carbon-fiber composite material with a carbon-fiber composite striking face plate glued at the front end of the head base still lacks diversification in stiffness designs.

SUMMARY OF THE INVENTION

The objective of the invention is to provide a carbon-fiber composite golf club head to solve the drawbacks that a counterweight of a conventional carbon-fiber composite golf club head is low, and a head base made of a carbon fiber composite material with a carbon fiber composite striking face plate glued at a front end of the head base can hardly have diversities in designs of flexibility.

The carbon-fiber composite golf club head comprises a carbon-fiber composite body, at least one carbon-fiber composite component and at least one weight component. The carbon-fiber composite body is one-piece formed by stacking multiple carbon fiber prepreg materials, and comprises a body portion, a hosel portion and a striking face portion. The body portion is hollow and has a crown, a sole and at least one opening. The at least one opening is formed at either or both of the crown and the sole. The hosel portion is disposed at a side of a front end of the body portion. The striking face portion is disposed at the front end of the body portion. The at least one carbon-fiber composite component is one-piece formed by stacking multiple carbon fiber prepreg materials, and is mounted at the at least one opening of the body portion. The at least one weight component is mounted at a rear end of the body portion of the carbon-fiber composite body.

The carbon-fiber composite golf club head has the following advantages:

1. Reducing a weight of the carbon-fiber composite body to increase a weight of counterweight: The present invention uses the carbon-fiber composite body that is one-piece formed by carbon fiber composite material and comprises the body portion and the striking face portion, then combining the carbon-fiber composite body with the at least one carbon-fiber composite component, therefore significantly reducing a weight of a main part of a club head to increase the weight of counterweight.
2. Increasing design freedoms of counterweight and changing a center of gravity of a club head: As mentioned above, the present invention comprises the carbon-fiber composite body that is one-piece formed by carbon fiber composite material and comprises the body portion and the striking face portion. By combining the carbon-fiber composite body and the at least one carbon-fiber composite component, the present invention significantly reduces the weight of the main part of the club head to increase the weight of counterweight. Thus, without affecting the necessary strength of the carbon-fiber composite body itself, the carbon-fiber composite body reduces its weight and the reduced weight allows more weight for the counterweight and therefore a wide margin of reduced weight, hence relatively increasing a margin of counterweight and the design freedoms of counterweight. At the same time, through adjusting and altering the weight of counterweight, the center of gravity of the club head can be changed, thereby increasing the striking performance of the club head.

Additionally, by a sandwich structure composited by an inner layer component clamped in a face base made from carbon-fiber composite of the striking face portion, the striking face portion possesses proper strength and impact resistance. Based on that, the striking face portion can have changes of different stiffness through choosing the inner layer component made with different materials or carbon fiber composite materials having different moduli. Therefore a coefficient of restitution (COR) of the striking face portion can be changed and combinations between the striking face portion and the inner layer component are diversified to adjust a carry distance, ease of striking, feel of striking, and striking audio frequency of the club. So stiffness designs of the club head is diversified.

DETAILED DESCRIPTION OF THE PREFERRED EMBODIMENT

Figure 1:
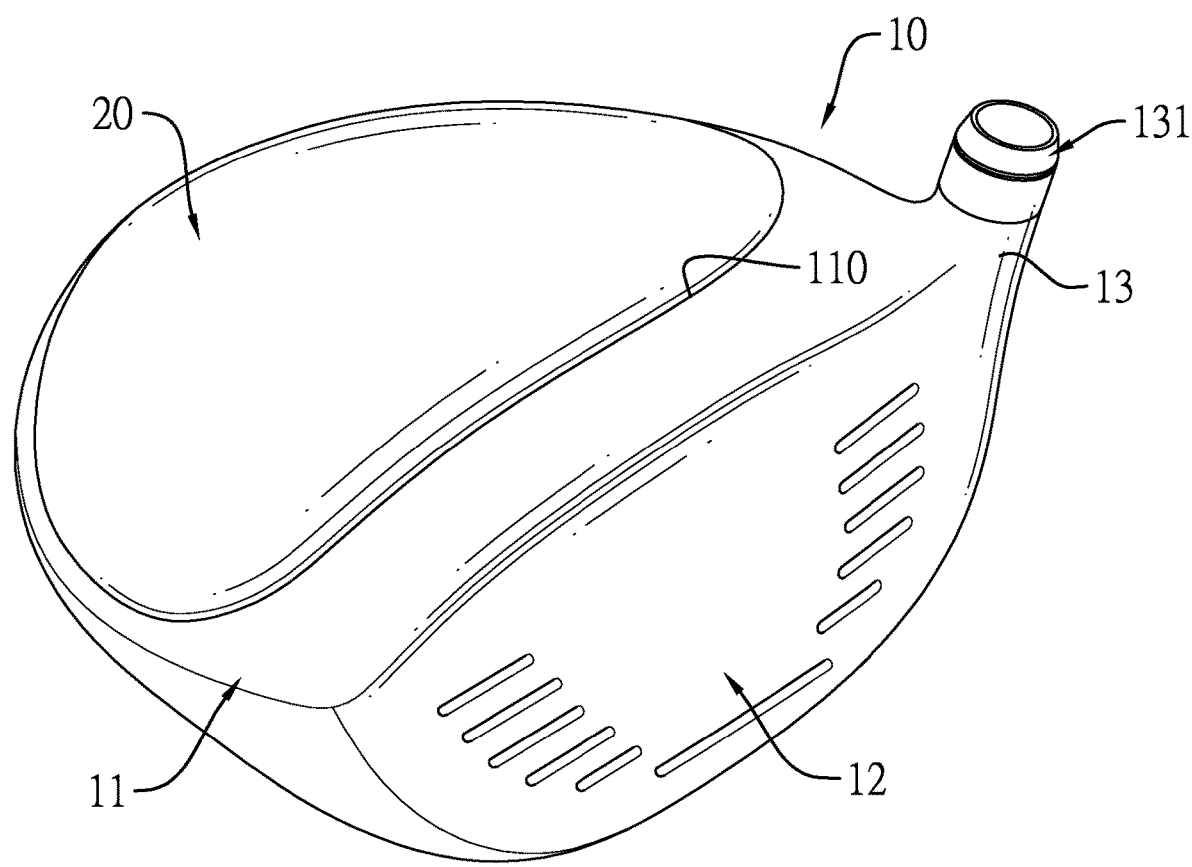
FIG. 1 is a front perspective view of a carbon-fiber composite golf club head in accordance with the present invention.
Figure 2:
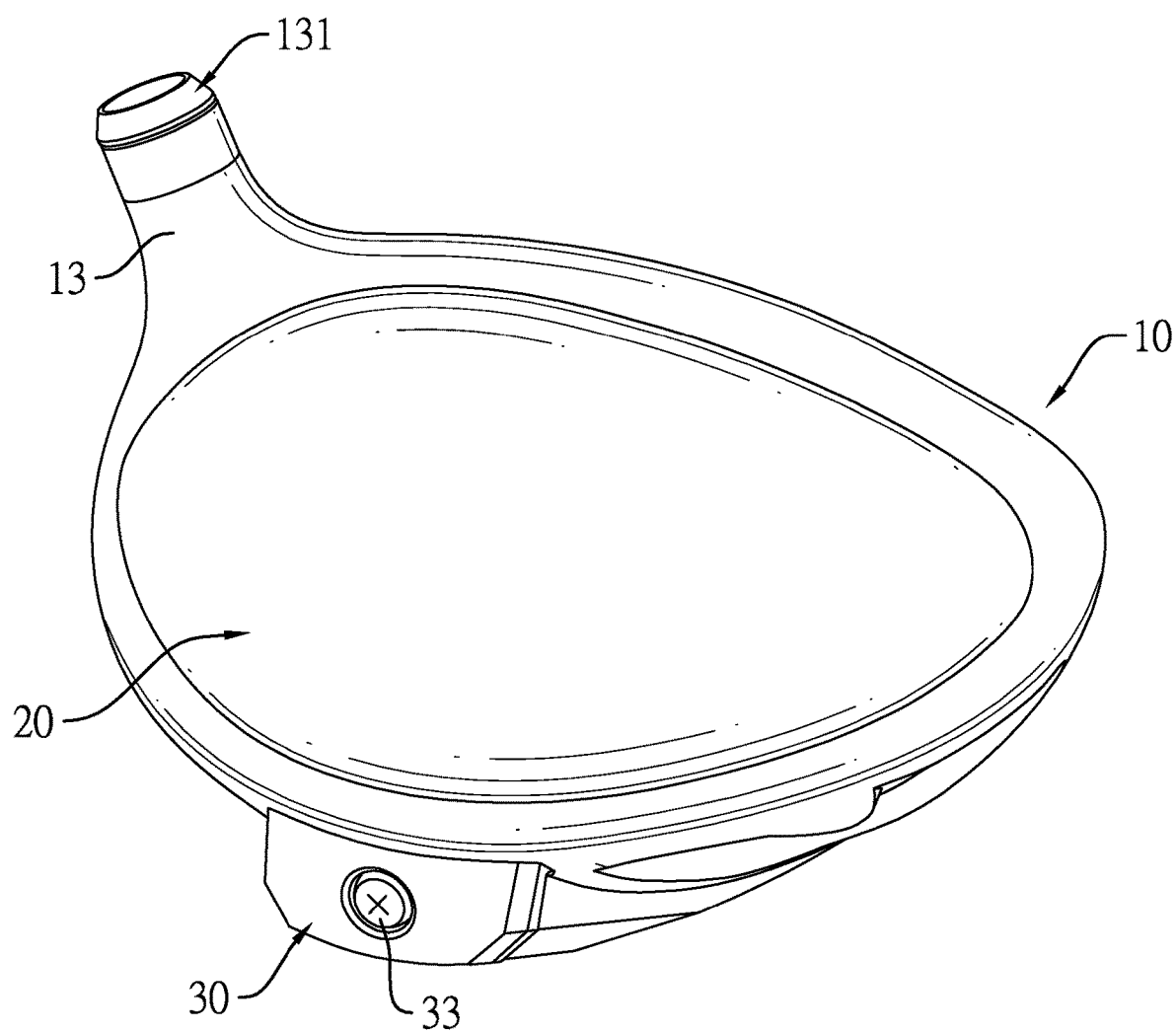
FIG. 2 is a rear perspective view of the carbon-fiber composite golf club head in FIG. 1.
Figure 3:
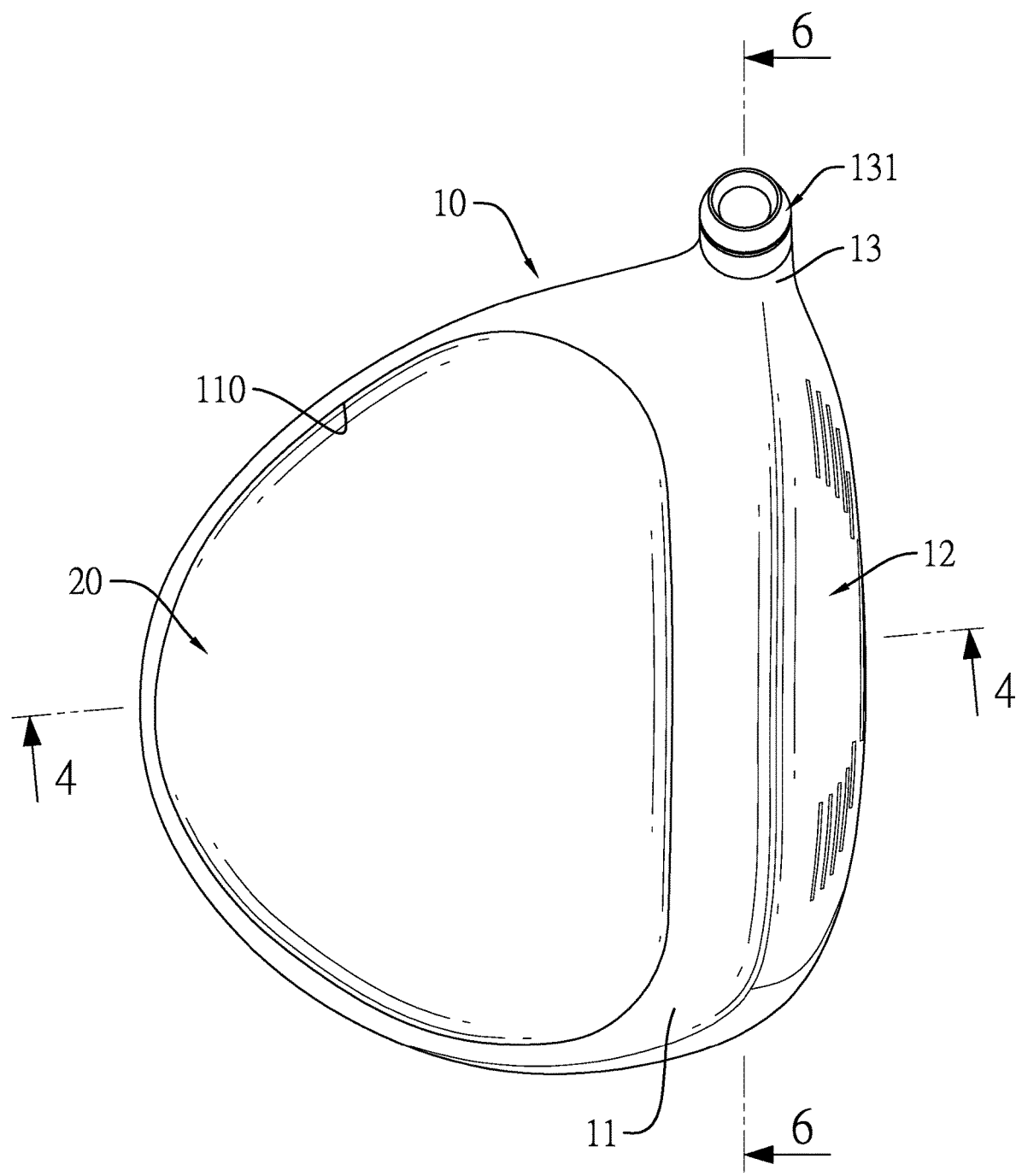
FIG. 3 is an upper view of the carbon-fiber composite golf club head in FIG. 1.

With reference to FIGS. 1 and 2, a carbon-fiber composite golf club head in accordance with the present invention comprises a carbon-fiber composite body 10, at least one carbon-fiber composite component 20 and at least one weight component 30.

With reference to FIGS. 1 to 4, the carbon-fiber composite body 10 is one-piece formed by choosing multiple carbon fiber prepreg materials having same or different moduli and stacking them in a mold, and comprises a hollow body portion 11, a hosel portion 13 and a striking face portion 12. The hosel portion 13 is disposed at a side of a front end 111 of the body portion 11. The striking face portion 12 is disposed at the front end 111 of the body portion 11. The body portion 11 has a crown, a sole and at least one opening 110. The at least one opening 110 is formed at either or both of the crown and the sole and is in fluid communication with an interior of the body portion 11. A stiffness of the body portion 11, a stiffness of the hosel portion 13 and a stiffness of the striking face portion 12 are all the same, all different from each other, or partially different from each other.

In a preferable embodiment shown in FIGS. 1 to 4, the at least one opening 110 of the body portion 11 is formed at the crown of the body portion 11. As the aforementioned, the at least one opening 110 can be formed at the sole of the body portion 11, or both of the crown and the sole can form one of the at least one opening 110. In the preferable embodiment shown in FIG. 4, the body portion 11 has a rear recess portion 14 disposed at a rear end 112 of the body portion 11, and the at least one weight component 30 is mounted at the rear recess portion 14. A position of the rear recess portion 14 can be changed according to the performance of a club head product.

With reference to FIGS. 1 to 4, the striking face portion 12 comprises a face base 120 formed by stacking carbon fiber prepreg materials. The face base comprises a striking section 120A and an outer peripheral section 120B surrounding an outer edge of the striking section 120A. The face base 120 is connected to the body portion 11 by the outer peripheral section 120B. A stiffness of the striking section 120A and a stiffness of the outer peripheral section 120B are same or different. Or preferably, the stiffness of the striking section 120A is greater than the stiffness of the outer peripheral section 120B.

In the preferable embodiment shown in FIGS. 1 to 4, the striking face portion 12 forms a sandwich structure by clamping an inner layer component inside the face base 120 formed by stacking carbon fiber prepreg materials. A material of the inner layer component 123 is metal or non-metal. A choice of the material of the inner layer component 123 can be set due to the performance requirements of products. The material of the inner layer component 123 has a material property different from the face base 120. By the sandwich structure made from combining the lightweight carbon-fiber composite face base 120 and the inner layer component 123 with a material property different from the face base 120, a coefficient of restitution (COR) of the striking face portion 12 can be changed according to different needs of club head products.

Additionally, the material of the inner layer component 123 can be selected from rigid metal materials such as titanium alloy, magnesium alloy, aluminum alloy, iron alloy, etc. By clamping the inner layer component 123 made from rigid metal materials inside the face base 120 made from carbon fiber composite materials, a stiffness of the striking face portion 12 is increased. When using the striking face portion 12 to strike a golf ball, a clinking metallic sound is generated and the striking face portion 12 is assisted to deform flexibly to increase a carry distance of the golf ball after striking. Or, the material of the inner layer component 123 can be selected from polymer material, elastic material or stone, etc., to increase the shock absorption performance of the striking face portion 12. Alternatively, while a material of the face base 120 is chosen from low tonnage (low modulus) carbon fiber prepreg, such as 24 tons (230 Gpa in modulus) carbon fiber prepreg, the material of the inner layer component 123 can be chosen from medium or high tonnage (medium or high modulus) carbon fiber prepreg, such as from 30 tons to 60 tons (from 270 Gpa to 560 Gpa in modulus) carbon fiber prepreg. Preferably, the inner layer component 123 uses high tonnage carbon fiber prepreg, such as 60 tons carbon fiber prepreg, thereby making a stiffness and a strength of the inner layer component 123 greater than a stiffness and a strength of the face base 120. As above mentioned, by the sandwich structure in which the face base 120 of the striking face portion 12 clamps the inner layer component 123 inside, the striking face portion 12 possesses proper strength and impact resistance. Based on that, through choosing the inner layer component 123 with different materials or carbon fiber prepreg having different moduli, the striking face portion 12 can have different stiffness, therefore to change the coefficient of restitution (COR) of the striking face portion 12.

With reference to FIGS. 1 to 4, in the striking face portion 12, the face base 120 comprises the striking section 120A and the outer peripheral section 120B surrounding the striking section 120A. The outer peripheral section 120B is one-piece formed at the front end 111 of the body portion 11. The striking section 120A comprises a front segment 121, a rear segment 122 disposed behind the front segment 121 and a containing space formed between the front segment 121 and the rear segment 122. The inner layer component 123 is mounted in the containing space. The front segment 121 and the rear segment 122 clamp the inner layer component 123 front-and-rear correspondingly. The outer peripheral section 120B surrounds and is connected to the front segment 121 and the rear segment 122, thereby enclosing and fixing the inner layer component 123 in the striking section 120A.

Figure 5:
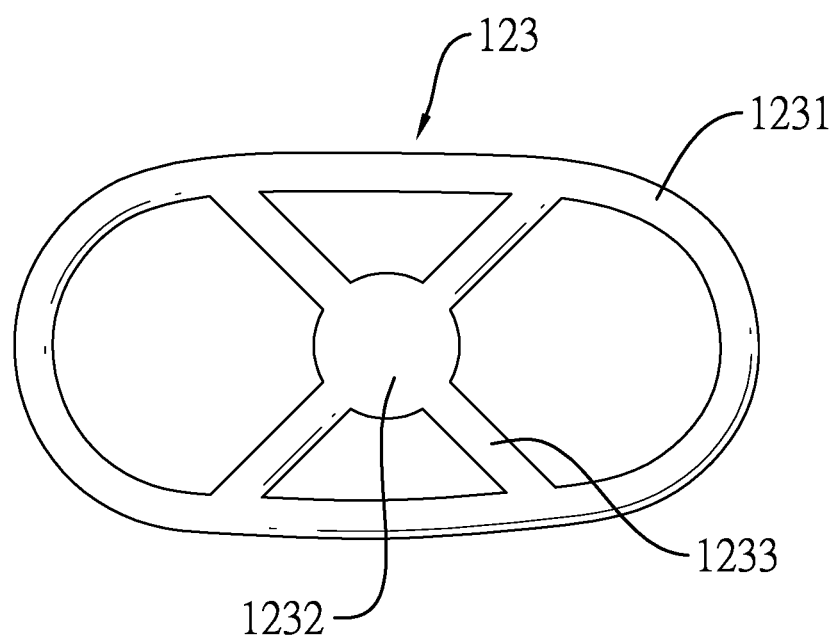
FIG. 5 is a front view of an inner layer component, which has multiple hollow portions and is mounted in a striking face portion of the carbon-fiber composite golf club head.
Figure 6:
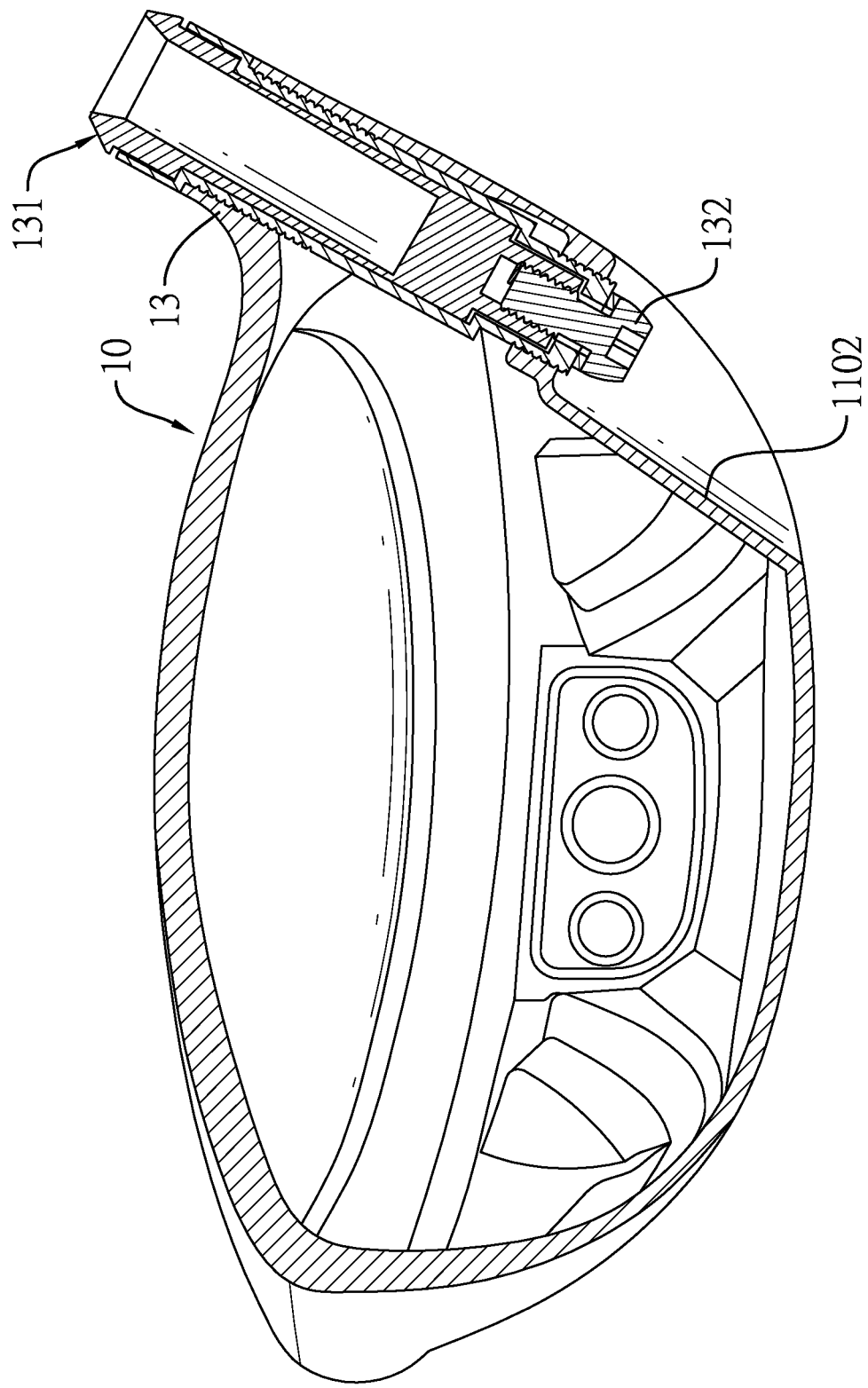
FIG. 6 is a partial sectional view across line 6-6 in FIG. 3.

A shape of the inner layer component 123 in the striking face portion 12 preferably matches an intended striking range. The inner layer component 123 can be a whole face plate, a net plate or a plate with multiple hollow portions. Based on the inner layer component 123 possessing a preset strength, a weight of the inner layer component 123 can be properly reduced by meshes of the net plate or by the multiple hollow portions. With reference to FIG. 5, the inner layer component 123 comprises a surrounding ring 1231, a core chunk 1232 disposed in the surrounding ring 1231, and multiple connecting ribs 1233. A center of the core chunk 1232 is located at a geometry center of the inner layer component 123. The multiple connecting ribs 1233 are spaced apart from each other and connect an outer periphery of the core chunk 1232 and an inner periphery of the surrounding ring 1231, thus dividing a space between the core chunk 1232 and the surrounding ring 1231 into multiple hollow portions.

With reference to FIGS. 1 to 4, a thickness of the body portion 11 is approximately from 0.5 mm to 1.5 mm. A thickness t4 of a combination of the front segment 121, the inner layer component 123 and the rear segment 122 is approximately from 4 mm to 6 mm. A thickness t3 of the outer peripheral section 120B is approximately from 3.5 mm to 4.5 mm. A thickness t5 of the inner layer component 123 is approximately from 0.7 mm to 1.2 mm. In the preferable embodiment, a thickness t1 of a front section of the body portion 11 is approximately 1.4 mm, a thickness t2 of a rear section of the body portion 11 is approximately 0.7 mm, the thickness t3 of the outer peripheral section 120B of the striking face portion 12 is 4 mm, the total thickness t4 of the part, clamping the inner layer component 123, of the striking section 120A is 5 mm, and the thickness t5 of the inner layer component 123 is 1 mm.

Figure 4:
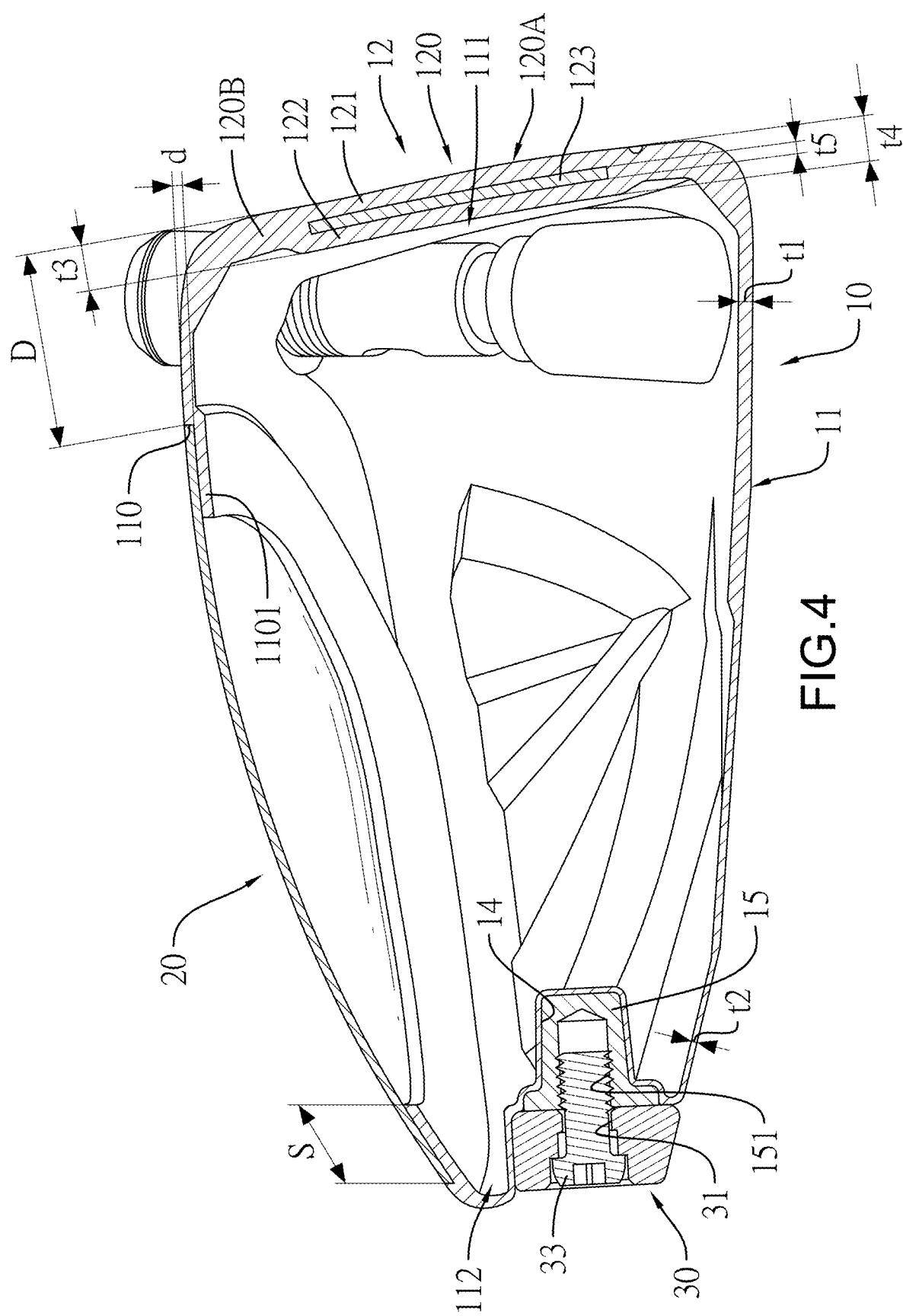
FIG. 4 is a partial sectional view across line 4-4 in FIG. 3.

With reference to FIG. 4, a loading ring portion 1101 is formed at an inner side of the at least one opening 110 of the body portion 11. A step distance d, which is between an outer side surface of the loading ring portion 1101 and an outer peripheral face of the body portion 11, of the body portion 11 is approximately from 0.7 mm to 1 mm. Preferably, the step distance d is 0.7 mm. A width s of the loading ring portion 1101 is approximately from 8 mm to 12 mm. Preferably, the width s of the loading ring portion 1101 is 10 mm. A distance D between a front edge of the at least one opening 110 of the body portion 11 and a front side face of the striking face portion 12 is approximately from 15 mm to 25 mm. Preferably, the distance D between the front edge of the at least one opening 110 of the body portion 11 and the front side face of the striking face portion 12 is 20 mm. Therefore, as the front end 111 of the body portion 11 and a periphery of the striking face portion 12 are one-pieced formed, and by maintaining a preserved length between the front edge of the at least one opening 110 and the striking face portion 12, the present invention possesses high stiffness, thereby sufficiently bearing an impact force when striking a golf ball.

With reference to FIGS. 1 to 4, the at least one carbon-fiber composite component 20 is one-piece formed by stacking multiple carbon fiber prepreg materials in a mold and is fixed in the at least one opening 110 of the carbon-fiber composite body 10 by gluing or other fixing method. While the at least one opening 110 is formed at the crown of the body portion 11 of the carbon-fiber composite body 10, the at least one carbon-fiber composite component 20 is a top cap. While the at least one opening 110 is formed at the sole of the body portion 11 of the carbon-fiber composite body 10, the at least one carbon-fiber composite component 20 is a bottom cap.

With reference to FIGS. 1 to 4, the loading ring portion 1101 is formed at the inner side of the at least one opening 110 of the body portion 11. The at least one opening 110 is in fluid communication with the interior of the body portion 11 through an inner peripheral space of the loading ring portion 1101. A step distance exists between the outer side surface of the loading ring portion 1101, located at the inner side of the at least one opening 110, and the outer peripheral face of the body portion 11. A shape of the at least one carbon-fiber composite component 20 matches a shape of the at least one opening 110. A thickness of the at least one carbon-fiber composite component 20 matches the above-mentioned step distance. The at least one carbon-fiber composite component 20 is glued and fixed at the at least one opening 110 of the carbon-fiber composite body 10, and is combined with the loading ring portion 1101 and a periphery of the at least one opening 110.

With reference to FIGS. 1 to 3 and 6, a ferrule 131 made by lightweight metals is mounted at the hosel portion 13 that is one-piece formed at the side of the front end 111 of the body portion 11. The lightweight metals can be chosen from titanium alloy, etc. A mounting hole is formed at a bottom end of the ferrule 131. A front recess portion 1102 is formed at a bottom part of the front end 111 of the body portion 11 and is corresponding in position to and in fluid communication with the mounting hole. A ferrule screw 132 is inserted through the front recess portion 1102 at the bottom part of the front end 111 of the body portion 11 and screws and fixes the ferrule 131 in the body portion 11. Therefore the ferrule 131 is changeable/replaceable when needed.

Figure 7:
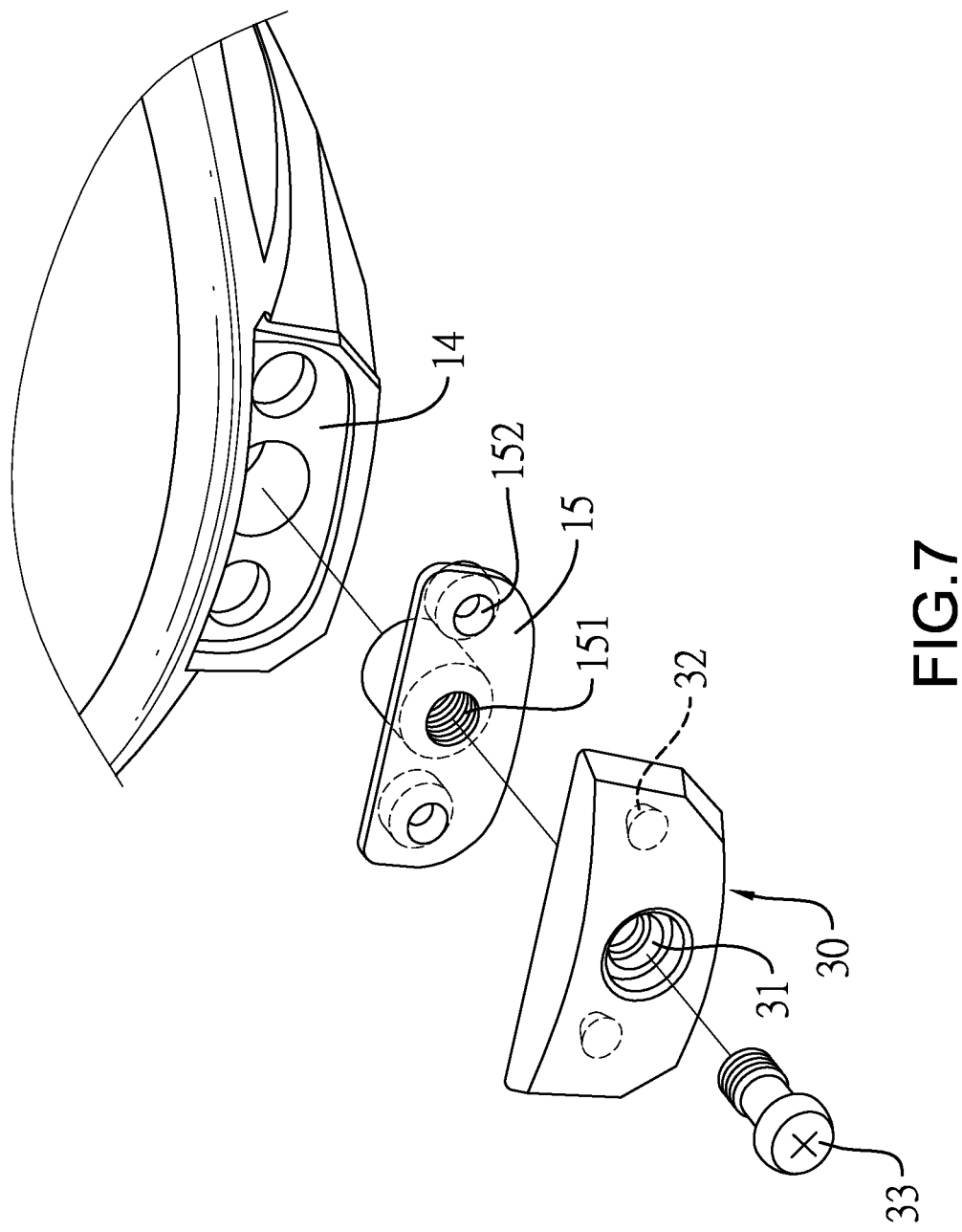
FIG. 7 is a rear partial exploded perspective view of the carbon-fiber composite golf club head in FIG. 1.

With reference to FIGS. 2, 4 and 7, an amount of the at least one weight component 30 can be one or multiple, and the amount of the at least one weight component 30 is decided based on needs of club head products. The at least one weight component 30 is fixed at the rear end 112 of the body portion 11 of the carbon-fiber composite body 10. By using carbon fiber composite materials as a material of the carbon-fiber composite body 10 and a material of the at least one carbon-fiber composite component 20, a weight of the present invention is reduced significantly, thereby adapting the reduced weight for a weight of the at least one weight component 30. Compared to a counterweight of a conventional club head that is about 20 g, a counterweight composed by one or more of the at least one weight component 30 of the present invention is increased to reach 20 g to 70 g approximately, thereby increasing a margin of counterweight adjustment. And by increasing a weight of counterweight at a rear end of a club head, a center of gravity of the club head is moved backward, thus to increase a carry distance of a golf ball after being struck by the club head. In the preferable embodiment shown in figures, a fixing seat 15 is glued and fixed at the rear recess portion 14 at the rear end 112 of the body portion 11, thereby facilitating the at least one weight component 30 to be fastened and positioned by a screw. Preferably, a weight of the at least one weight component 30 is from 55 g to 65 g, and a weight of the fixing seat 15 is from 8 g to 12 g. Most preferably, the weight of the at least one weight component 30 is 60 g±1 g.

With reference to FIGS. 2, 4 and 7, in the aforementioned, the fixing seat 15 can be chosen from an element that is formed by metal materials (such as stainless steel, aluminum alloy, etc.), and the at least one weight component 30 is an element that is formed by metal materials (for example, high specific gravity materials such as tungsten nickel alloy, etc.) having greater specific gravity than carbon fiber composite materials. The at least one weight component 30 is fixed at a rear side of the fixing seat 15 by a screw. In addition, the fixing seat 15 has a screw hole 151 at a rear side thereof and at least one fixing hole 152 disposed at either or both of two sides of the screw hole 151. The at least one weight component 30 has a through hole 31 corresponding to the screw hole 151 in position. A counterweight screw 33 is inserted through the through hole 31 and fastened in the screw hole 151 of the fixing seat 15. At a front side of the at least one weight component 30 has at least one positioning pole 32, in a concave-convex complementary manner, engaged with the at least one fixing hole 152 that is corresponding in position. So the at least one weight component 30 is fixed at the rear side of the fixing seat 15 stably. A fixing effect can be achieved even positions of the at least one positioning pole 32 and of the at least one fixing hole 152 are interchanged.

By the description on the overall structure of the present invention, it is understandable that the present invention uses the carbon-fiber composite body 10 which is one-piece formed by carbon fiber composite material and comprises the body portion 11 and the striking face portion 12. By combining the carbon-fiber composite body 10 and the at least one carbon-fiber composite component 20, a weight of a main part of a club head is significantly reduced to increase the weight of counterweight to 20 g to 70 g. Compared to a weight of counterweight of the conventional club head that is about 20 g, the present invention can effectively increase the weight of counterweight. At the same time, without affecting the necessary strength of the carbon-fiber composite body 10 itself, the carbon-fiber composite body 10 reduces weight to adapt the reduced weight for counterweight and therefore has a wider margin of reduced weight, hence relatively increasing the margin of counterweight and the design freedoms of counterweight. At the same time, through adjusting and altering the weight of counterweight, a center of gravity distance (i.e., a horizontal distance between the center of gravity and a surface of a striking face) of the club head is increased or the center of gravity is set at a better position, thus to increase a moment of inertia (MOI) during the club head striking and thereby increasing the striking performance of the club head.

Furthermore, by the sandwich structure compositied by the inner layer component 123 clamped in the face base 120, made from the carbon-fiber composite material, of the striking face portion 12, the striking face portion 12 possesses proper strength and impact resistance. Based on that, the present invention can perform with different degrees of stiffness through choosing the inner layer component 123 with different materials or carbon fiber composite materials having different moduli. Therefore a coefficient of restitution (COR) of the striking face portion 12 is changeable and changing combinations are diversified. And the carry, the playability, the striking feeling and the striking audio frequency of the club head are adjustable, diversifying stiffness designs of the club head.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the board general meaning of the terms in which the appended claims are expressed.

What is claimed is:

1. A carbon-fiber composite golf club head comprising:
a carbon-fiber composite body being one-piece formed by stacking multiple carbon fiber prepreg materials, and the carbon-fiber composite body comprising:
a body portion being hollow, and having a crown, a sole and at least one opening, wherein the at least one opening is formed at either or both of the crown and the sole; the body portion having:
a rear recess portion formed at a rear end of the body portion;
a fixing seat glued and fixed at the rear recess portion, and having:
a screw hole; and
at least one fixing hole disposed at either or both of two sides of the screw hole;
a hosel portion disposed at a side of a front end of the body portion;
a striking face portion disposed at the front end of the body portion;
at least one carbon-fiber composite component being one-piece formed by stacking multiple carbon fiber prepreg materials, and mounted at the at least one opening of the body portion respectively; and
at least one weight component mounted at the rear end of the body portion of the carbon-fiber composite body; wherein:
the at least one weight component has:
a through hole corresponding to the screw hole in position;
at least one positioning pole at a front side of the at least one weight component, in a concave-convex complementary manner, engaged with the at least one fixing hole that corresponds in position; and
a counterweight screw is inserted through the through hole and screwed in the screw hole of the fixing seat to fix the at least one weight component at a rear side of the fixing seat.

2. The carbon-fiber composite golf club head as claimed in claim 1, wherein the carbon-fiber composite body is one-piece formed by stacking multiple carbon fiber prepreg materials having different moduli.

3. The carbon-fiber composite golf club head as claimed in claim 1, wherein a stiffness of the body portion, a stiffness of the hosel portion, and a stiffness of the striking face portion are same.

4. The carbon-fiber composite golf club head as claimed in claim 1, wherein a stiffness of the body portion, a stiffness of the hosel portion, and a stiffness of the striking face portion are different from each other.

5. The carbon-fiber composite golf club head as claimed in claim 1, wherein a stiffness of the body portion, a stiffness of the hosel portion and a stiffness of the striking face portion are partially different from each other.

6. The carbon-fiber composite golf club head as claimed in claim 1, wherein the striking face portion has a face base formed by stacking carbon fiber prepreg materials and comprising:
a striking section; and
an outer peripheral section surrounding an outer edge of the striking section; and
a stiffness of the striking section and a stiffness of the outer peripheral section are different.

7. The carbon-fiber composite golf club head as claimed in claim 6, wherein the stiffness of the striking section is greater than the stiffness of the outer peripheral section.

8. The carbon-fiber composite golf club head as claimed in claim 1, wherein the striking face portion has:
a face base formed by stacking carbon fiber prepreg materials and comprising:
a striking section; and
an outer peripheral section surrounding an outer edge of the striking section, a stiffness of the striking section and a stiffness of the outer peripheral section being same, and
wherein the striking face portion has:
an inner layer component clamped inside the face base; and
a material of the inner layer component is metal or non-metal.

9. The carbon-fiber composite golf club head as claimed in claim 7, wherein the striking face portion has:
- an inner layer component clamped inside the face base; and
- a material of the inner layer component is metal or non-metal.

10. The carbon-fiber composite golf club head as claimed in claim 8, wherein the outer peripheral section is one-piece formed at the front end of the body portion; and the striking section comprises:
- a front segment;
- a rear segment disposed behind the front segment; and
- a containing space formed between the front segment and the rear segment;
- wherein the inner layer component is mounted in the containing space; the front segment and the rear segment clamp the inner layer component front-and-rear correspondingly; the outer peripheral section surrounds and is connected to the front segment and the rear segment, thereby enclosing and fixing the inner layer component in the striking section.

11. The carbon-fiber composite golf club head as claimed in claim 9, wherein the outer peripheral section is one-piece formed at the front end of the body portion; and the striking section comprises:
- a front segment;
- a rear segment disposed behind the front segment; and
- a containing space formed between the front segment and the rear segment;
- wherein the inner layer component is mounted in the containing space; the front segment and the rear segment clamp the inner layer component front-and-rear correspondingly; the outer peripheral section surrounds and is connected to the front segment and the rear segment, thereby enclosing and fixing the inner layer component in the striking section.

12. The carbon-fiber composite golf club head as claimed in claim 11, wherein a thickness of the body portion is from 0.5 mm to 1.5 mm; a thickness of a combination of the front segment, the inner layer component and the rear segment is from 4 mm to 6 mm; a thickness of the outer peripheral section is from 3.5 mm to 4.5 mm; a thickness of the inner layer component is from 0.7 mm to 1.2 mm.

13. The carbon-fiber composite golf club head as claimed in claim 10, wherein the inner layer component comprises:
- a surrounding ring;
- a core chunk disposed in the surrounding ring, and a center of the core chunk located at a geometry center of the inner layer component; and
- multiple connecting ribs spaced apart from each other and connecting an outer periphery of the core chunk and an inner periphery of the surrounding ring, and dividing a space between the core chunk and the surrounding ring into multiple hollow portions.

14. The carbon-fiber composite golf club head as claimed in claim 11, wherein the inner layer component comprises;
- a surrounding ring;
- a core chunk disposed in the surrounding ring, and a center of the core chunk located at a geometry center of the inner layer component; and
- multiple connecting ribs spaced apart from each other and connecting an outer periphery of the core chunk and an inner periphery of the surrounding ring, and dividing a space between the core chunk and the surrounding ring into multiple hollow portions.

15. The carbon-fiber composite golf club head as claimed in claim 1, wherein a weight of the at least one weight component is from 20 g to 70 g.

* * * * *